(12) United States Patent
Morrissey et al.

(10) Patent No.: US 10,091,306 B2
(45) Date of Patent: *Oct. 2, 2018

(54) SYSTEM AND METHOD FOR MANAGEMENT OF ETHERNET PREMISE DEVICES

(71) Applicant: CenturyLink Intellectual Property LLC, Denver, CO (US)

(72) Inventors: Michael Morrissey, Overland Park, KS (US); Clinton Smoyer, Raymore, CO (US); Jade Kerr, Honolulu, HI (US); Andrew Cook, Sheldon, IA (US); Kevin McBride, Lone Tree, CO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/403,733

(22) Filed: Jan. 11, 2017

(65) Prior Publication Data

US 2017/0126814 A1    May 4, 2017

Related U.S. Application Data

(60) Continuation of application No. 14/460,012, filed on Aug. 14, 2014, now Pat. No. 9,584,603, which is a
(Continued)

(51) Int. Cl.
*G06F 15/16* (2006.01)
*H04L 29/08* (2006.01)
(Continued)

(52) U.S. Cl.
CPC ............ *H04L 67/143* (2013.01); *H04L 12/12* (2013.01); *H04L 41/28* (2013.01); *H04L 61/2061* (2013.01)

(58) Field of Classification Search
CPC .......... H04L 67/43; H04L 12/12; H04L 41/28
(Continued)

(56) References Cited

U.S. PATENT DOCUMENTS 5,504,746 A    4/1996 Meier et al.
5,617,540 A    4/1997 Civanlar et al.
(Continued)

OTHER PUBLICATIONS

U.S. Appl. No. 14/460,012; Non-Final Rejection dated Apr. 22, 2016; 26 pages.
(Continued)

*Primary Examiner* — Duyen M Doan
(74) *Attorney, Agent, or Firm* — Swanson & Bratshun, L.L.C.

(57) ABSTRACT

A system and method for managing customer premise equipment (CPE) devices. A wake signal is issued to the CPE device. Action parameters are communicated to the CPE device in response to receiving acknowledgement of the wake signal from the CPE device. A management session is established with the CPE device utilizing an address for secure communications in response to the CPE device acknowledging the action parameters. Communications are performed through the management session to perform operation, administration, and maintenance of the CPE device. The management session with the CPE device is terminated.

22 Claims, 4 Drawing Sheets

Related U.S. Application Data division of application No. 12/642,185, filed on Dec. 18, 2009, now Pat. No. 8,868,764.

(51) Int. Cl.
*H04L 12/12* (2006.01)
*H04L 12/24* (2006.01)
*H04L 29/12* (2006.01)

(58) Field of Classification Search
USPC .......................................... 709/223–225, 229
See application file for complete search history.

(56) References Cited

U.S. PATENT DOCUMENTS

| | | | |
|---|---|---|---|
| 5,960,062 | A | 9/1999 | Chang et al. |
| 6,308,328 | B1 | 10/2001 | Bowcutt |
| 6,396,912 | B1 | 5/2002 | Mueller et al. |
| 6,445,926 | B1 | 9/2002 | Boch et al. |
| 6,496,511 | B1 | 12/2002 | Wang et al. |
| 6,522,641 | B1 | 2/2003 | Siu et al. |
| 6,523,126 | B1 | 2/2003 | Brabenac |
| 6,526,131 | B1 | 2/2003 | Zimmerman et al. |
| 6,584,080 | B1 | 6/2003 | Ganz et al. |
| 6,587,457 | B1 | 7/2003 | Mikkonen |
| 6,888,803 | B1 | 5/2005 | Gentry et al. |
| 6,971,029 | B1 | 11/2005 | Avery, IV et al. |
| 6,976,269 | B1 | 12/2005 | Avery et al. |
| 6,987,769 | B1 | 1/2006 | Dougherty |
| 7,089,009 | B1 | 8/2006 | Faconnier |
| 7,190,686 | B1 | 3/2007 | Beals |
| 7,200,655 | B2 | 4/2007 | Hunt et al. |
| 7,561,540 | B2 | 7/2009 | Doughterty |
| 7,561,895 | B1 | 7/2009 | Hohnstein |
| 7,600,003 | B1 | 10/2009 | Okmianski |
| 7,643,890 | B1 | 1/2010 | Hillen et al. |
| 7,930,000 | B2 | 4/2011 | Quigley et al. |
| 8,098,605 | B2 | 1/2012 | Dougherty et al. |
| 8,122,486 | B2 | 2/2012 | West |
| 8,365,253 | B2 | 1/2013 | West |
| 8,868,764 | B2 | 10/2014 | Morrissey et al. |
| 9,584,603 | B2 | 2/2017 | Morrissey et al. |
| 2001/0043609 | A1 | 11/2001 | Chapman et al. |
| 2002/0013847 | A1 | 1/2002 | Fisher et al. |
| 2004/0076160 | A1 | 4/2004 | Phaltankar |
| 2005/0005026 | A1 | 1/2005 | Brown |
| 2005/0170829 | A1 | 8/2005 | Seo |
| 2005/0220180 | A1 | 10/2005 | Barlev et al. |
| 2005/0262241 | A1 | 11/2005 | Gubbi |
| 2006/0002407 | A1 | 1/2006 | Sakamoto |
| 2006/0015626 | A1* | 1/2006 | Hallamaa ............ H04L 41/5054 709/229 |
| 2006/0041650 | A1* | 2/2006 | Luo ................... H04L 29/12367 709/223 |
| 2006/0056397 | A1* | 3/2006 | Aizu ...................... H04L 12/66 370/352 |
| 2006/0092931 | A1 | 5/2006 | Walter |
| 2007/0025341 | A1 | 2/2007 | Baigal et al. |
| 2007/0162607 | A1* | 7/2007 | Droms ............. H04L 29/12273 709/228 |
| 2008/0002711 | A1* | 1/2008 | Bugenhagen ......... H04W 28/18 370/395.2 |
| 2008/0052766 | A1* | 2/2008 | Esperet ................... H04L 12/46 726/3 |
| 2008/0175251 | A1 | 7/2008 | Ooouchi et al. |
| 2009/0125633 | A1* | 5/2009 | Watsen ................. H04L 63/029 709/229 |
| 2009/0260059 | A1 | 10/2009 | West |
| 2009/0307474 | A1 | 12/2009 | Johnston |
| 2010/0106817 | A1 | 4/2010 | Jang |
| 2010/0299419 | A1 | 11/2010 | Ramankutty et al. |
| 2011/0087763 | A1 | 4/2011 | George |
| 2011/0153837 | A1 | 6/2011 | Morrissey et al. |
| 2012/0117630 | A1 | 5/2012 | West |
| 2014/0359149 | A1 | 12/2014 | Morrissey et al. |

OTHER PUBLICATIONS

U.S. Appl. No. 14/460,012; Notice of Allowance dated Oct. 11, 2016; 18 pages.
U.S. Appl. No. 12/100,112; Final Rejection dated Apr. 14, 2011; 10 pages.
U.S. Appl. No. 12/100,112; Issue Notification dated Feb. 1, 2012; 1 page.
U.S. Appl. No. 12/100,112; Non-Final Rejection dated Jan. 5, 2011; 14 pages.
U.S. Appl. No. 12/100,112; Notice of Allowance dated Oct. 12, 2011; 7 pages.
U.S. Appl. No. 12/642,185; Final Office Action dated Oct. 17, 2012; 18 pages.
U.S. Appl. No. 12/642,185; Issue Notification dated Oct. 1, 2014; 1 page.
U.S. Appl. No. 12/642,185; Non-Final Office Action dated Jan. 21, 2014; 19 pages.
U.S. Appl. No. 12/642,185; Non-Final Office Action dated Aug. 30, 2012; 21 pages.
U.S. Appl. No. 12/642,185; Notice of Allowance dated May 16, 2014; 19 pages.
U.S. Appl. No. 13/348,903; Issue Notification dated Jan. 9, 2013; 1 page.
U.S. Appl. No. 13/348,903; Non-Final Rejection dated Sep. 20, 2012; 12 pages.
U.S. Appl. No. 13/348,903; Notice of Allowance dated Oct. 16, 2012; 7 pages.

\* cited by examiner

SYSTEM AND METHOD FOR MANAGEMENT OF ETHERNET PREMISE DEVICES

CROSS REFERENCE TO RELATED APPLICATION

This application is a continuation application of U.S. patent application Ser. No. 14/460,012, filed Aug. 14, 2014 by Morrissey et al. and titled, "System and Method for Management of Ethernet Premise Devices", which is a divisional application of U.S. patent application Ser. No. 12/642,185 (now U.S. Pat. No. 8,868,764), filed Dec. 18, 2009 by Morrissey et al. and titled, "System and Method for Management of Ethernet Premise Devices", the entire teachings of which are incorporated herein by reference in its entirety.

BACKGROUND OF THE INVENTION

The use of and development of communications has grown nearly exponentially in recent years. The growth is fueled by larger networks with more reliable protocols and better communications hardware available to service providers and customers. In many cases, customers operate extensive equipment, networks, connections, systems, facilities, and devices. In some cases, it is difficult to diagnose, troubleshoot, and repair communications problems between a service provider and the customer.

In particular, communications service providers struggle with managing customer premise equipment (CPE) because of the inherent security issues of Ethernet. For example, a communications service provider may communicate directly with all of the Ethernet devices at a customer location utilizing open communications sessions. The communications sessions may be directed to Internet protocol (IP) addresses that are publicly available, increasing the likelihood that security may be bypassed, infiltrated, or otherwise violated. Communications service providers constantly strive to give both the perception of security as well as security-in-fact utilizing secure and reliable connections and communications.

SUMMARY

One embodiment provides a system and method managing customer premise equipment (CPE) devices. A wake signal may be issued to the CPE device. Action parameters may be communicated to the CPE device in response to receiving acknowledgement of the wake signal from the CPE device. A management session may be established with the CPE device utilizing an address for secure communications in response to the CPE device acknowledging the action parameters. Communications may be performed through the management session to perform operation, administration, and maintenance of the CPE device. The management session with the CPE device may be terminated.

Yet another embodiment provides a CPE device. The CPE device may include a processor for executing a set of instructions and a memory for storing the set of instructions. The set of instructions may include daemon logic operable to initiate a request form management from a communications management system in response to detecting an event, exchange state information in a management session, and terminate a management session in response to receiving a termination command from the communications management system.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

The illustrative embodiments of the present invention provide a system and method for implementing a secure management session to a number of CPE devices and systems. In one embodiment, management sessions may be established and terminated for secure communications with one or more Ethernet devices at a customers premises. As a result, the service provider may more securely manage Ethernet CPE utilizing selective signaling.

Figure 1:
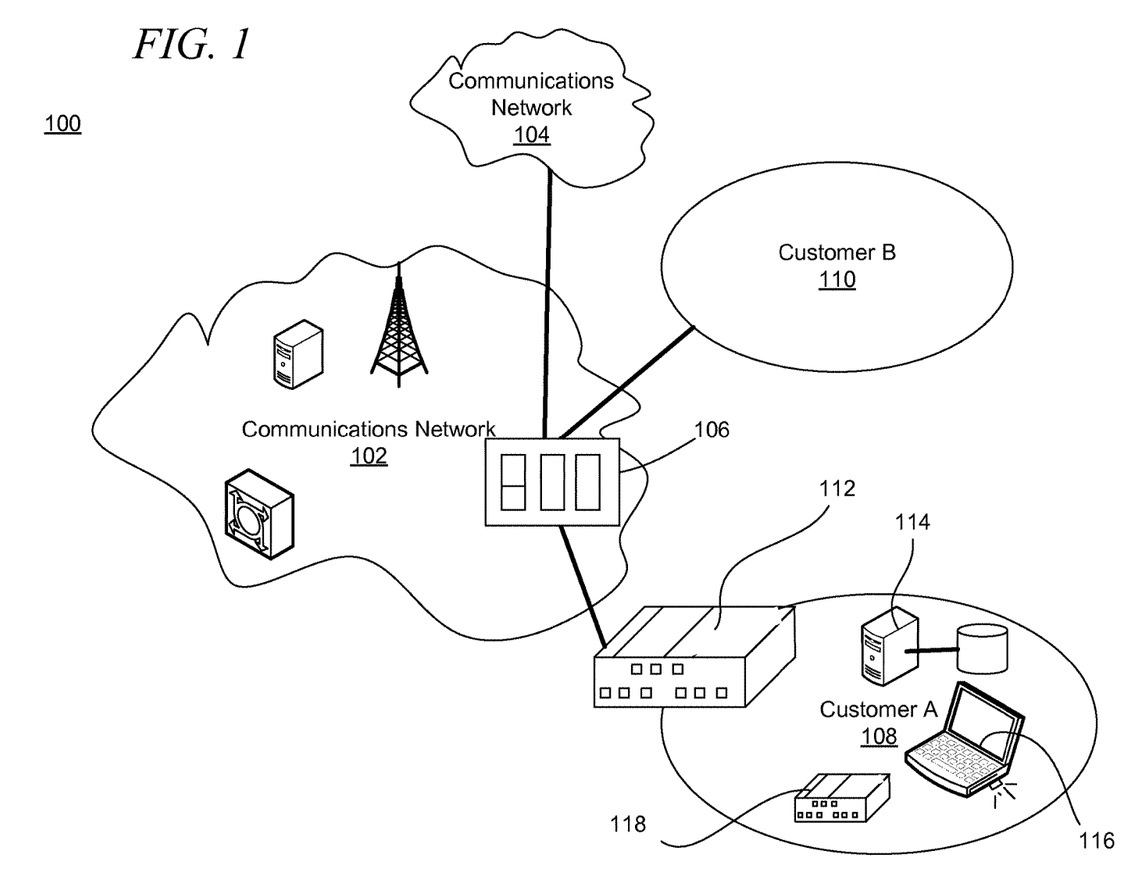
FIG. 1 is a pictorial representation of a communications environment in accordance with an illustrative embodiment.

FIG. 1 is a pictorial representation of a communications environment in accordance with an illustrative embodiment. The communications environment 100 is an embodiment of a communications network, systems, and devices utilized between one or more communications service providers and one or more customers or other users. In one embodiment, the communications environment 100 may include communications networks 102 and 104, a communications management system 106, a customer A 108, a customer B 110, a CPE device 112, and premise devices 114, 116, and 118.

Communications within the communications environment 100 may occur on any number of networks which may include wireless networks, data or packet networks, cable networks, satellite networks, private networks, publicly switched telephone networks (PSTN), data networks, or other types of communication networks. The communications networks 102 and 104 are infrastructures for sending and receiving data, messages, packets, and signals according to one or more designated formats, standards, and protocols. The communications networks 102 and 104 may represent a single communication service provider or multiple communications services providers.

In one embodiment, the communications networks 102 and 104 may include any number of devices, systems, and equipment. For example, the communications networks 102 and 104 may enable data and voice communications. The elements of the communications environment 100 may communicate using a Ethernet or a signal control protocol, such as a signaling system number 7 (SS7) protocol or TCP/IP protocols. In one embodiment, Ethernet may be utilized to perform in-band signaling. The SS7 protocol or similar protocols are used to establish connections with or between switches, perform out-of-band signaling in support of the communications, billing, routing, and information-exchange functions of the communications environment 100. Customer A 108 and Customer B 110 represent a number of users or customers that benefit from communications services and devices provided by the communications service provider. Although simplified for purposes of illustration, the communications service provider may communicate with any number of customer premise devices, customers, private networks, or other parties or device to provide the features and processes herein described.

Customers A 108 and B 110 represent the customer networks, network devices, connections and other communications elements controlled by customers or users. In one embodiment, Customers A 108 and B 110 may utilize Ethernet signals, protocols, and devices. The Customers A 108 and B 110 may have agreements or contracts with the service provider operating the communications network 102 to operate, administer, maintain, monitor, or otherwise control various devices, systems, equipment, or networks.

The communications management system 106 is one or more devices utilized to provision, test, activate, enable, initiate, route, and manage communications for one or more network devices. The communications management system 106 may include one or more devices networked to manage the communications networks 102 and 104. In one embodiment, the communications management system 106 is a network operation center, central office, or Ethernet system, equipment, or device. For example, the communications management system 106 may include any number of servers, routers, switches, or advanced intelligent devices. The communications network 102 may send and receive the electronic signals through any number of transmission mediums. The communications network 102 may include various fiber optics, cables, transmission towers, antennas, or other elements for transmitting communications to the connected devices.

An illustrative embodiment provides a system and method for securely extending Ethernet communications, standards and protocols. For example, the IEEE 802.3ah standard for link layer operations and an administration and maintenance (OAM) protocol data unit (PDU) may be extended to provide secure management of the CPE device 112 from the communications management system 106.

In one embodiment, the communications management system 106 may establish a management session with key devices of customer A 108, such as the CPE device 112, that may further communicate or manage devices, such as devices 114, 116, and 118. For example, if customer B 110 has 5000 network devices, such as deployed premise switches, existing systems may utilize 5000 management IP addresses to manage the network and devices of customer B 110. In one embodiment, the communications service provider may assign 100 Internet Protocol (IP) addresses or less for the on-demand management of the 5000 devices. As a result, management IP addresses are assigned for devices being actively managed at any point in time and commands and updates may only be passed to devices that are assigned a valid management IP addressed through the proposed system and method of managing Ethernet premise devices (i.e. OAM protocol extension, wake up process, DHCP assignment of a mgmt IP address). In one embodiment, establishment of the management session may occur in layer 2 of the open systems interconnection (OSI) reference model and communications may occur at both layer 2 and layer 3. By limiting management signaling that functions at layer 2 between the communications management system 106 and the premise Ethernet devices, management security risks may be significantly reduced. Similarly, the amount of private space and addresses that are required to be addressed and tracked (in databases or otherwise) are limited, saving resources and management time.

The management session may be established in real-time or based on scheduled intervals rather than being open or existing at all times. For example, communications between the communications management system 106 and the CPE device 112 may be scheduled at 10:30 p.m. daily to communicate performance information, statistics, and configuration updates. In one embodiment, the communications service provider may conserve resources by performing in-band management of devices. For example, management sessions may be established only as needed reducing the potential for security breaches.

Figure 2:
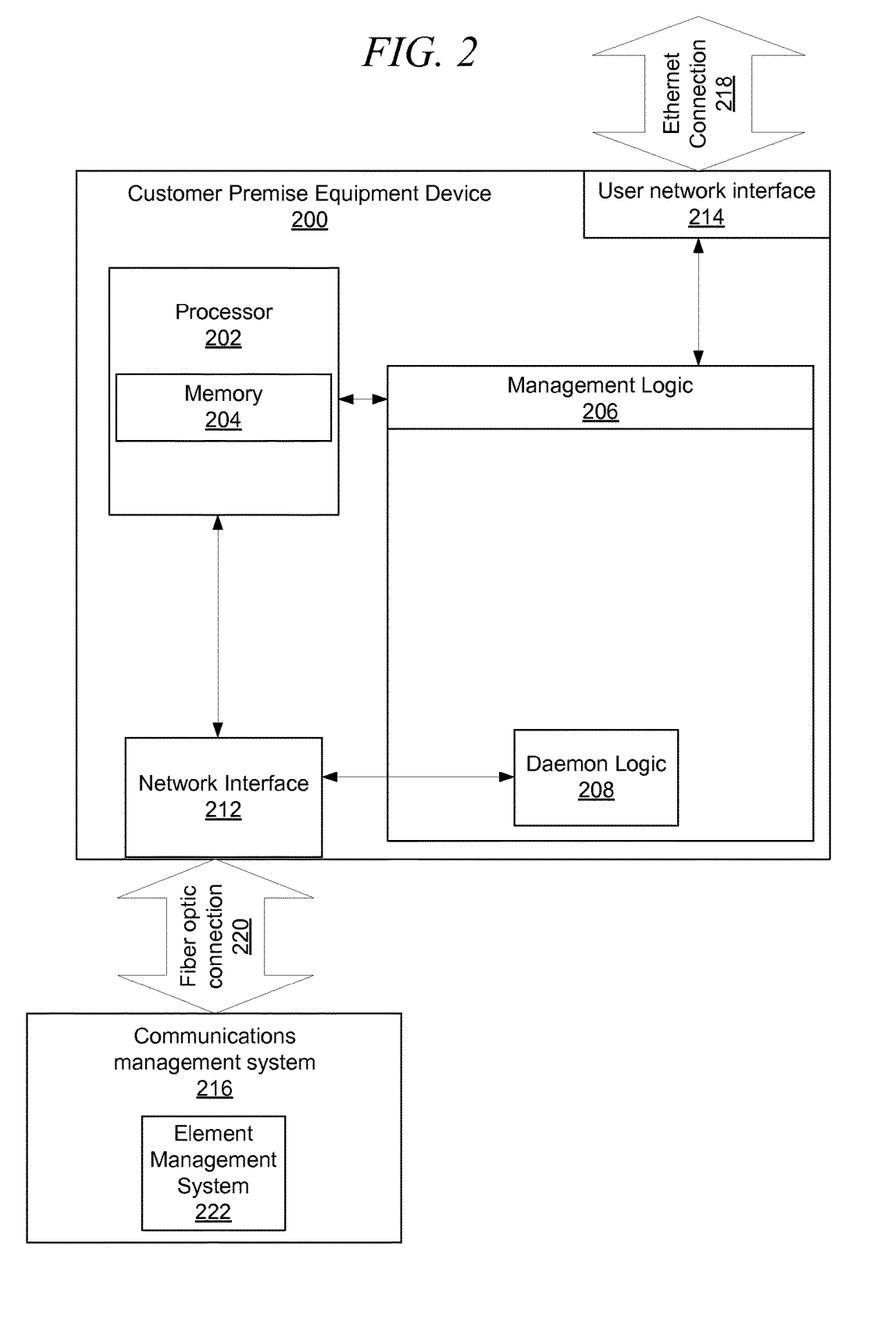
FIG. 2 is a pictorial representation of a CPE device in accordance with an illustrative embodiment.

FIG. 2 is a pictorial representation of a customer premise equipment (CPE) device 200 in accordance with an illustrative embodiment. The CPE device 200 is a particular implementation of the CPE device 112 of FIG. 1. In one embodiment, the CPE device 200 may include a processor 202, a memory 204, management logic 206, daemon logic 208, a network interface 212, and user network interface 214. The CPE device 200 may communicate with various other devices including a communications management system 216 through an Ethernet connection 218 and a fiber optic connection 220.

The communications management system 216 may further include an element management system 222. The CPE device 200 may be a router, switch, edge device, interface, or other device separating a service provider network and the customer network, system, or devices. In one embodiment, the CPE device 200 is a specialized computing and communications device operable to implement the modules, functionality, or processes of the processor 202, the memory 204, the management logic 206, the daemon logic 208, the network interface 212, and the user network interface 214.

The processor 202 is circuitry or logic enabled to control execution of a set of instructions. The processor 202 may be microprocessors, digital signal processors, application-specific integrated circuits (ASIC), central processing units, or other devices suitable for controlling an electronic device. The processor 202 may include one or more hardware and software elements, executing software, instructions, programs, and applications, converting and processing signals and information, and performing other related tasks. The processor 202 may be a single chip or integrated with other computing or communications elements.

The memory 204 is a hardware element, device, or recording media, configured to store data for subsequent retrieval or access at a later time. The memory 204 may be static or dynamic memory. The memory 204 may include a hard disk, random access memory, cache, removable media drive, mass storage, or configuration suitable as storage for data, instructions, and information. In one embodiment, the memory 204 and processor 202 may be integrated. The memory 204 may use any type of volatile or non-volatile storage techniques and mediums.

The CPE device 200 may communicate with any number of networks. In one embodiment, the CPE device 200 may communicate with the networks through the fiber optic connection 220 and the Ethernet connection 204. In another embodiment, both connections may be fiber optic or may utilize other communications standards, mediums, types, or processes. In one embodiment, the CPE device 200 may communicate with the service provider through the fiber optic connection 220. Similarly, the CPE device 200 may communicate with a customer network, equipment, or systems through the Ethernet connection 218. The CPE device 200 may include any number of computing and telecommunications components, devices, or elements which may include busses, motherboards, circuits, ports, interfaces, cards, connections, converters, adapters, transceivers, displays, antennas, and other similar components.

The network interface 212 is an interface for enabling communication with the CPE device 200 through a network. The user network interface 214 is an interface for enabling communication between the customer's network, equipment, or systems and the CPE device 200.

The management logic 206 is logic, modules and functionality for implementing management sessions between the CPE device 200 and the communications management system 216. In one embodiment, the management logic 206, daemon logic 208, and the element management system 222 are application specific integrated circuit (ASIC), field programmable gate arrays (FPGA), or Ethernet chipsets. In another embodiment, the management logic 206 may be integrated with the processor 202 and/or memory to implement the processes and features herein described.

The daemon logic 208 is logic or a module that is active on the CPE device 200 waiting for action parameters. In one embodiment, the daemon logic 208 is a software module stored in the memory 204 that is constantly executed by the processor 202 or an operating system. The daemon logic 208 may utilize minimum processing power to actively wait for a command to awake or initiate a management session with the communications management system 216.

The element management system 222 is logic or a module utilized to manage Ethernet selective signaling sessions for the communications management system 216 in the communications service provider network. In one embodiment, the element management system 222 manages management sessions to one or more CPE devices including initiating, monitoring, logging, batch scheduling, and terminating the sessions. The daemon logic 208 and the element management system 222 act as session interfaces for initiating, implementing, and terminating the management sessions between the CPE device 200 and the communications management system 216.

In one embodiment, the element management system 222 may establish the management session utilizing a MAC address in layer 2 rather than an IP address. Once the management session is established, communications may occur through the simple network management protocol (SNMP) at layer 3. The management session may be utilized to exchange statistics, perform specific reporting, determine packets in and out, monitor alarms, determine the power, temperature and status of the CPE device 200

In one embodiment, the management session may be torn down if there is not activity for 60 minutes or for another specified time period. Other factors utilized to tear down or terminate the session may include detection of network signal degradation or equipment failure conditions that impacts effective communication.

The daemon logic 208 may also operate as an agent of the CPE device 200 to recognize system alarms and events and trigger a management session back to the communications management system 216 for a network health evaluation without utilizing an always-on management session. In one embodiment, the events and alarms may include bandwidth threshold exceeded, environmental alarms, link state changes, traffic errors, etc. One example of operation of the daemon logic 208 is given in FIG. 4.

The daemon logic 208 may also operate as an agent of the CPE device 200 to collect system and customer specific statistics and then report the statistics to one or more network monitoring and reporting devices or platforms, such as the communications management system 216, at predetermined intervals. As a result, the daemon logic 208 may generate and communicate the necessary statistics for creation of network and customer reports (i.e. daily/weekly port utilization and SLA adherence reports).

Any number of architectures may be utilized. In one embodiment, a point-to-point architecture may be utilized between devices of the communications environment implementing a management session. In one embodiment, the daemon logic 208 and element management system 222 may interact on an as needed basis so that a management session is not always ongoing.

Figure 3:
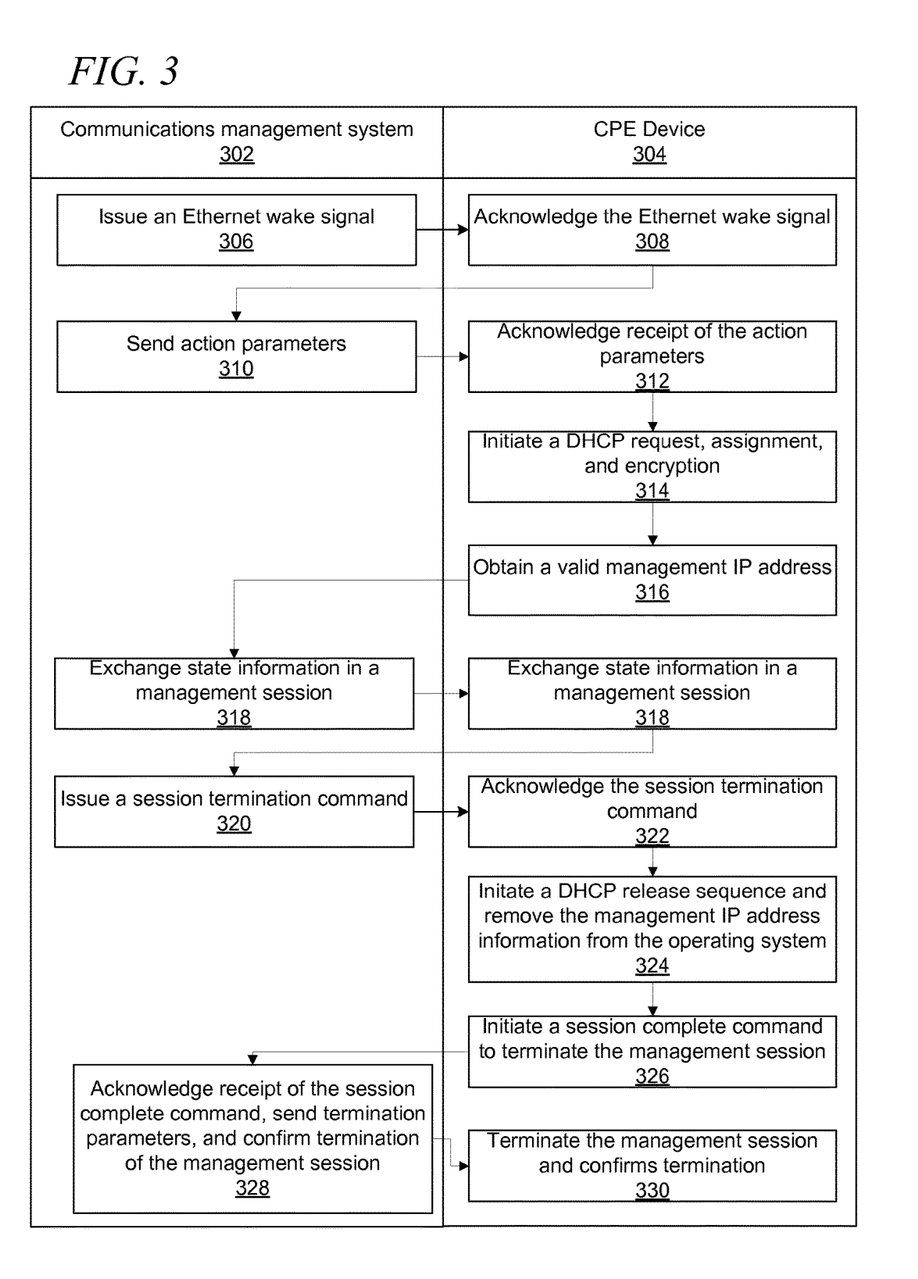
FIG. 3 is a flowchart of a process for implementing a management session to a CPE device in accordance with an illustrative embodiment.

FIG. 3 is a flowchart of a process for implementing a management session to a CPE device in accordance with an illustrative embodiment. In one embodiment, the process of FIG. 3 may be implemented by a communications management system 302 and a CPE device 304. The devices may further include chipsets, modules, ASICs, processors, FPGAs, or other elements, such as a daemon logic and element management system, to perform the communications and tasks herein described. Alternatively, any number of devices available through an Ethernet connection at the customers premises may be utilized.

The process of FIG. 3 may be initiated based on a need or requirement that the communications management system 302 communicate with the CPE device 304 to perform any number of management tasks including configuration, reconfiguration, reporting, statistic retrieval (i.e. utilization, throughput), updates, modifications, maintenance, troubleshooting or other administrative or maintenance tasks.

The process may begin with the communications management system 302 issuing an Ethernet wake signal (step 306). In one embodiment, the wake signal may be issued through layer 2 of the OSI model via the proposed extension of the IEEE 802.3ah link layer OAM PDU. The communications management system 302 may communicate with the CPE device 304 through any number of wired or wireless connections, links, standards or protocols.

The CPE device 304 acknowledges the Ethernet wake signal (step 308). The CPE device 304 may acknowledge the wake signal utilizing a separate message, flag or by an action taken by the CPE device 304 itself. For example, the CPE device 304 may activate logic configured to communicate through a management session.

Next, the communications management system 302 sends action parameters (step 310). The action parameters may be operating system instructions for a CPE device and/or daemon logic to initialize the dynamic host configuration protocol (DHCP) in the CPE device including elements, such as a processor, memory, and management logic.

Next, the CPE device 304 acknowledges receipt of the action parameters (step 312). The CPE device 304 initiates a DHCP request assignment and encryption (step 314). Next, the CPE device 304 obtains a valid management IP address (step 316). The IP address may be a private address utilized to manage the CPE device 304 as well as a number of other Ethernet devices on the customer's premises or other similar equipment. In one embodiment, the MAC address may be used only by the proposed extension of the IEEE 802.3ah link layer OAM PDU to "wake up" the CPE device and to provide instructions to bring the CPE device 304 layer 3 IP addressing & communication into an active state.

Next, the communications management system 302 and the CPE device 304 exchange state information in a management system (step 318). The state information may include the instructions, commands, processes and modules communicated between the communications management system 302 and the CPE device 304 to perform the management features and tasks for which the management session is established. Examples of state information may include the count of frames exchanged, packet sequencing, checksums, encryption information and keepalive messages.

At this point, the management session between the communications management system 302 and the CPE device 200 is fully active. The management session will remain in the active state until the session is terminated via predefined session timeout or CLI/EMS commands issued by the user to terminate the session.

Next, the communications management system 302 issues a session termination command (step 320). The session termination command may be communicated in response to a determination by the communications management system 302 that the purposes and goals of the management session have been completed. In one embodiment, the session termination command is initiated based on a preconfigured status or condition. For example, in response to determining the management session has been inactive for 30 minutes the session termination command may be generated by the communications management system 302.

Next, the CPE device 304 acknowledges the session termination command (step 322). The CPE device initiates a DHCP release sequence and removes the management IP address information from the operating system (step 324). The CPE device 304 further initiates a session complete command to terminate the management session (step 326).

The communications management system 302 acknowledges receipt of the session complete command, sends termination parameters and confirms termination of the management session (step 328). Next, the CPE device 304 terminates the management session and confirms termination (step 330).

Figure 4:
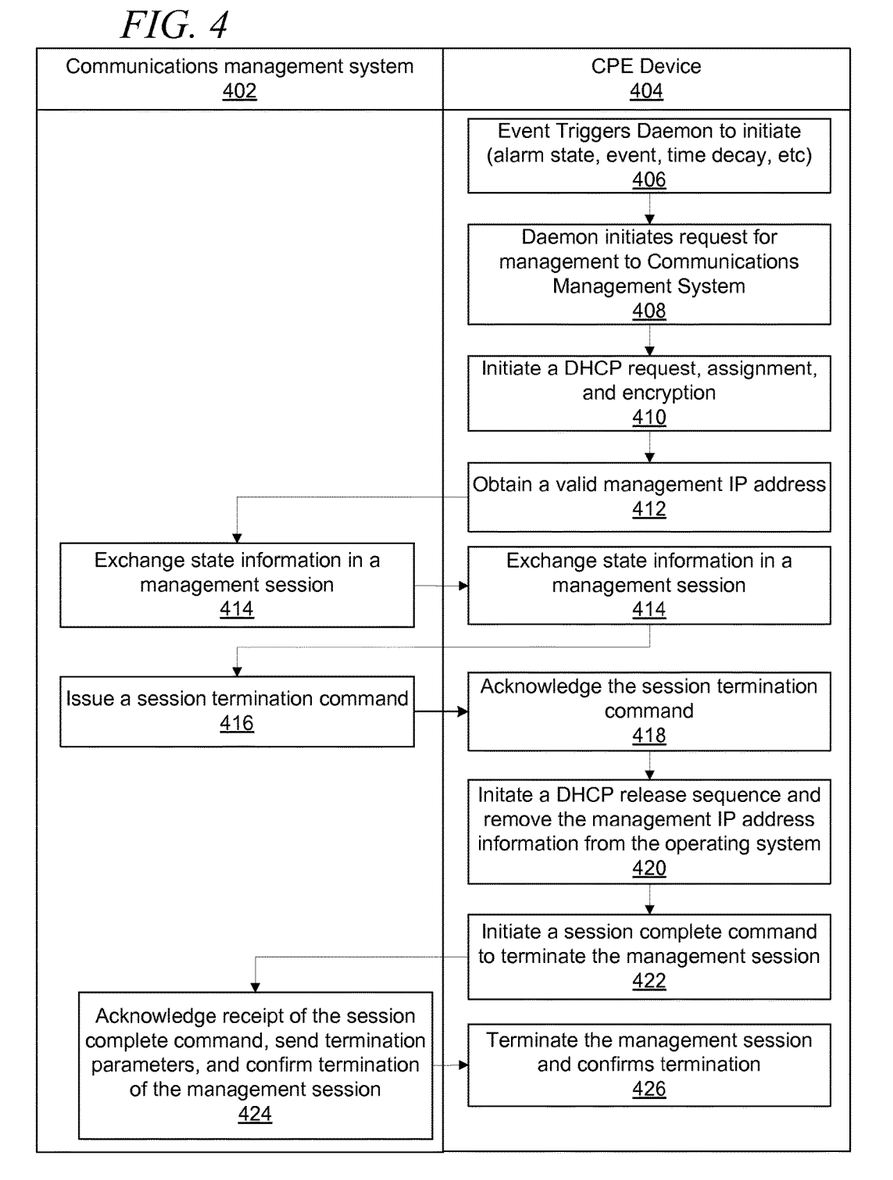
FIG. 4 is a flowchart of a process for implementing daemon logic in a CPE device in accordance with an illustrative embodiment.

FIG. 4 is a flowchart of a process for implementing daemon logic in a CPE device in accordance with an illustrative embodiment. The process of FIG. 4 may also be implemented between a communications management system 402 and a CPE device 404. The CPE device 404 may include daemon logic that may all or in part implement the processes, steps, and method described.

The process may begin with the CPE device 404 triggering the daemon to initiate in response to an event (step 406). The event may be an alarm state, user selection, time decay, or other happening that automatically or manually initiates the daemon.

Next, the CPE device 404 initiates a request for management to the communications management system 402 (step 408). The CPE device 404 then initiates a DHCP request, assignment, and encryption (step 410) and obtains a valid management IP address (step 412). The communications management system 402 and CPE device 404 exchanges state information in a management session (step 414).

Next, the communications management system 402 issues a session termination command (step 416). The CPE device 404 acknowledges the session termination command (step 418) and initiates a DHCP release sequence to remove the management IP address information from the operating system (step 420). The CPE device 404 initiates a session complete command to terminate the management session (step 422).

Next, the communications management system 402 acknowledges receipt of the session complete command, sends termination parameters, and confirms termination of the management session (step 424). The CPE device 404 terminates the management session and confirms termination (step 426).

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed is:

1. A method for managing customer premise equipment (CPE) devices, the method comprising:
   issuing a wake signal to a CPE device;
   assigning, from a set of private management IP addresses, a private management IP address, wherein addresses from the set of private management IP addresses are assigned to devices actively being managed;
   establishing a management session with the CPE device utilizing the private management IP address for secure communications, wherein the private address is assigned only to the CPE device and is assigned for the purpose of managing the CPE device;
   communicating through the management session using the private management IP address to issue a command to the CPE device; and
   terminating the management session with the CPE device, wherein terminating the management session includes releasing the private management IP address.

2. The method according to claim 1, wherein the management session is established at layer two of the open systems interconnection (OSI) model.

3. The method according to claim 1, wherein the management session is established utilizing a predetermined time period.

4. The method according to claim 1, wherein the communicating is performed at layer three of the OSI model.

5. The method according to claim 1, wherein the establishing and communicating are an extension of the IEEE 802.3ah standard.

6. The method according to claim 1, further comprising:
   receiving, from the CPE device, a dynamic host configuration protocol (DHCP) request; and
   assigning the private management IP address in response to the DHCP request.

7. The method according to claim 1, wherein communicating through the management session comprises sending one or more commands to the CPE device through the management session.

8. The method according to claim 7, wherein the CPE device communicates over a customer premise network, and wherein the one or more commands comprise a command to manage one or more devices at the customer premises, over the customer premise network.

9. The method according to claim 7, wherein the one or more commands comprises a command to collect and report statistics from a customer premise network.

10. The method according to claim 1, wherein terminating further comprises:
    issuing a termination command to the CPE device;
    releasing the private management IP address utilized for the management session; and
    sending termination parameters to the CPE device to terminate the management session.

11. The method according to claim 1, further comprising; establishing encryption for the management session.

12. A system for managing CPE devices, the system comprising:
    at least one microprocessor;

system memory comprising a non-transitory computer readable medium, having stored thereon a set of instructions executable by the at least one microprocessor to:
  issuing a wake signal to a CPE device;
  assigning, from a set of private management IP addresses, a private management IP address, wherein addresses from the set of private management IP addresses are assigned to devices actively being managed;
  establishing a management session with the CPE device utilizing the private management IP address for secure communications, wherein the private address is assigned only to the CPE device and is assigned for to manage the CPE device;
  communicating through the management session using the private management IP address to issue a command to the CPE device; and
  terminating the management session with the CPE device, wherein terminating the management session includes releasing the private management IP address.

13. The system according to claim 12, wherein the management session is established at layer two of the open systems interconnection (OSI) model.

14. The system according to claim 12, wherein the management session is established utilizing a predetermined time period.

15. The system according to claim 12, wherein the communicating is performed at layer three of the OSI model.

16. The system according to claim 12, wherein the establishing and communicating are an extension of the IEEE 802.3ah standard.

17. The system according to claim 12, further comprising:
  receiving, from the CPE device, a dynamic host configuration protocol (DHCP) request; and
  assigning the private management IP address in response to the DHCP request.

18. The system according to claim 12, wherein communicating through the management session comprises sending one or more commands to the CPE device through the management session.

19. The system according to claim 18, wherein the CPE device communicates over a customer premise network, and wherein the one or more commands comprise a command to manage one or more devices at the customer premises, over the customer premise network.

20. The system according to claim 18, wherein the one or more commands comprises a command to collect and report statistics from a customer premise network.

21. The system according to claim 12, wherein terminating further comprises:
  issuing a termination command to the CPE device;
  releasing the private management IP address utilized for the management session; and
  sending termination parameters to the CPE device to terminate the management session.

22. The system according to claim 12, further comprising;
  establishing encryption for the management session.

* * * * *